(12) United States Patent
Moore et al.

(10) Patent No.: US 12,444,440 B2
(45) Date of Patent: *Oct. 14, 2025

(54) SYSTEM AND METHOD FOR AUTOMATICALLY PREPARING PERSONALIZED VIDEO PRESENTATIONS

(71) Applicants: Timothy Kenneth Moore, Lutz, FL (US); Joseph Jonathan Register, Tampa, FL (US)

(72) Inventors: Timothy Kenneth Moore, Lutz, FL (US); Joseph Jonathan Register, Tampa, FL (US)

( * ) Notice: Subject to any disclaimer, the term of this patent is extended or adjusted under 35 U.S.C. 154(b) by 111 days.

This patent is subject to a terminal disclaimer.

(21) Appl. No.: 18/197,638

(22) Filed: May 15, 2023

(65) Prior Publication Data
US 2023/0282243 A1    Sep. 7, 2023

Related U.S. Application Data

(63) Continuation-in-part of application No. 16/988,259, filed on Aug. 7, 2020, now Pat. No. 11,651,026.

(60) Provisional application No. 62/883,705, filed on Aug. 7, 2019.

(51) Int. Cl.
*G11B 27/036*    (2006.01)
*A61B 5/16*    (2006.01)
*G11B 27/10*    (2006.01)

(52) U.S. Cl.
CPC ............ *G11B 27/036* (2013.01); *A61B 5/165* (2013.01); *G11B 27/10* (2013.01); *A61B 2503/12* (2013.01)

(58) Field of Classification Search
CPC ..... G11B 27/036; G11B 27/10; G11B 27/031; A61B 5/165; A61B 2503/12; A61B 5/742
See application file for complete search history.

(56) References Cited

U.S. PATENT DOCUMENTS

| | | | |
|---|---|---|---|
| 10,631,029 B1* | 4/2020 | Nijim | H04N 21/251 |
| 2012/0308211 A1* | 12/2012 | Xu | G16H 10/60 |
| | | | 386/E5.028 |
| 2012/0311649 A1* | 12/2012 | Patten | H04N 21/44222 |
| | | | 725/97 |
| 2019/0189158 A1* | 6/2019 | Oxholm | G06V 20/46 |

* cited by examiner

*Primary Examiner* — Nathan J Flynn
*Assistant Examiner* — Christine A Kurien
(74) *Attorney, Agent, or Firm* — The Keys Law Firm PLLC

(57) ABSTRACT

A system and method for automatically preparing personalized video presentations using a dynamic scene replacement engine which uses data points relating to a specific viewer to optimize the content of a video presentation for that specific viewer in order to increase the overall emotional effectiveness of the video presentation. The system and method for automatically preparing personalized video presentations operates to either identify stock personalizing video content clips or generate personalization video content clips which can replace generic scenes in a raw video presentation to add personalizing material designed to appeal to the particular viewer to the presentation. Through this action, a unique personalized video presentation may be automatically prepared on demand for every particular viewer.

20 Claims, 6 Drawing Sheets

SYSTEM AND METHOD FOR AUTOMATICALLY PREPARING PERSONALIZED VIDEO PRESENTATIONS

CROSS REFERENCE TO RELATED APPLICATIONS

This application claims the benefit of and incorporates by reference co-pending U.S. non-provisional patent application Ser. No. 16/988,259, filed Aug. 7, 2020, which itself claimed the benefit of U.S. provisional patent application Ser. No. 62/883,705 filed Aug. 7, 2019.

BACKGROUND OF THE INVENTION

Field of the Invention

The present disclosure relates to the preparation of personalized video presentations designed to increase the viewer's emotional response to the presentation and the optimization of systems for preparing such personalized video presentations.

Description of the Prior Art

It is well established through behavioral science that the images seen and themes present in a video presentation can greatly affect a viewer's emotional and physiological response to the content. This, in turn, increases their receptiveness to the message(s) contained. For example, when a viewer observes images or themes which they find familiar, interesting, or pleasing, it increases interest. This generally makes the viewer more receptive to the messages of the presentation. To maximize this emotional effect, the media content would be best selected, styled, timed, and themed for a specific person's demographic and behavior. In an ideal case, each edited video presentation would include variables such as age, race, gender, interests, and include cues about the persons prior behavior (e.g., buying habits). Curating these highly individualized presentations for a large population of people using traditional video editing processes is a time intensive process.

The conventional process of preparing a complete video presentation typically requires substantial manual action in at least the selection and/or combining of the source media. This intense amount of manual action, makes it infeasible to provide large populations of individual viewers with customized presentations which are personalized to each viewer's identity, personality, and interests. Moreover, while providers of video content have historically relied on demographic generalizations, these providers would often lack highly personalized data for particular viewers in the audience. Even if this data was obtained, providers would lack the ability to quickly customize the video for each audience member due to time resourcing.

Accordingly, what is needed is a system and method for automatically preparing personalized video presentations which utilizes user-unique metadata to dynamically, and automatically, assemble content into a personalized video presentation. The system would desirably select and/or generate the media, and also edit it based on a user profile so as to prepare content using available user metadata and improve its choices as it collects information from the video outcomes (quantifiable user responses and/or the user's biometric data recorded during the presentation event).

It would be advantageous for such a system to create presentations on-demand so that not all permutations would need to be stored simultaneously. And it would be desirable if such a system could further utilize generative artificial intelligence and/or a database of selectable video content which included meta tags which associated the selectable video content with potential viewer meta data to provide for customizing content. It would be additionally desirable for such a system to collect feedback data (behavior or biometric) to refine the algorithm and rulesets used to generate and/or select and edit the media content.

SUMMARY OF THE INVENTION

The present disclosure describes a method for automatically preparing personalized video presentations using computer generated and curated media, referred herein as dynamic scene replacement, and a system which employs the method, with the method comprising the steps of: initiating a provision of a personalized video presentation for a first viewer; providing a raw video presentation, wherein said raw video presentation includes at least one designated replacement slot; receiving viewer data related to the first viewer, wherein the viewer data relates to at least one of a current mood state of the first viewer and at least one of a demographic characteristic of the first viewer, and a topical interest of the first viewer; providing at least one personalizing video content clip which relates to the viewer data, wherein said at least one personalizing video content is not a part of the raw video presentation but is targeted for said at least one designated replacement slot; assembling the personalized video presentation, wherein the step of assembling includes inserting into said at least one designated replacement slot said at least one personalizing video content clip; and collecting viewing feedback data, wherein viewing feedback data relates to at least a change in the current mood state from the first viewer.

In some embodiments, the method for automatically preparing personalized video presentations using dynamic scene replacement may additionally comprise the steps collecting viewing feedback data and using such feedback data to either refine prompts for a generative artificial intelligence engine which is generating personalizing clips or applying at least one weight to a relationship between a stock personalizing video content clip and the viewer data based on the viewing feedback data. In this way, the method provides for updating the dynamic scene replacement engine with the viewing feedback data with the assistance of artificial intelligence and machine learning.

It is an object of this invention to provide a system and method for automatically preparing personalized video presentations which utilizes data points about a specific viewer to generate or select video content to which the viewer is likely to be drawn and dynamically insert the generated or selected video content as scenes into a personalized video presentation.

It is another object of this invention to provide a system and method for automatically preparing personalized video presentations which utilizes either a generative artificial intelligence system a cloud based database of selectable video content which includes meta tags that associate the selectable video content with potential viewer data points.

It is yet another object of this invention to provide a system and method for automatically preparing personalized video presentations which additionally collects data related to how a personalized video presentation was viewed when presented so as to enable evaluation of the efficacy of inserted scenes.

These and other objects will be apparent to one of skill in the art

DETAILED DESCRIPTION OF THE INVENTION

Described herein is a system and method for automatically preparing personalized video presentations using dynamic scene replacement which uses data points relating to a specific viewer to optimize the content of a video presentation for that specific viewer in order to increase the overall emotional effectiveness of the video presentation. The viewer specific data points may include gender, age, ethnicity, religion, neuro activity, language, topical interests, current mood state, in addition to behavior data and any other obtainable data. In this regard, the data values in these data points operate in a similar manner to a profile that updates with the static data and all of the dynamic updates for a particular viewer.

The data values in these data points are used to either generate personalizing video content clips using a generative artificial intelligence engine or identify selected personalizing video content clips from a library of potential personalizing video content clips. The personalizing video content clips can then replace generic scenes in a raw video presentation to add personalizing material to the presentation designed to appeal to the particular viewer. Through this action, a unique personalized video presentation may be automatically prepared on demand for every particular viewer.

Figure 1:
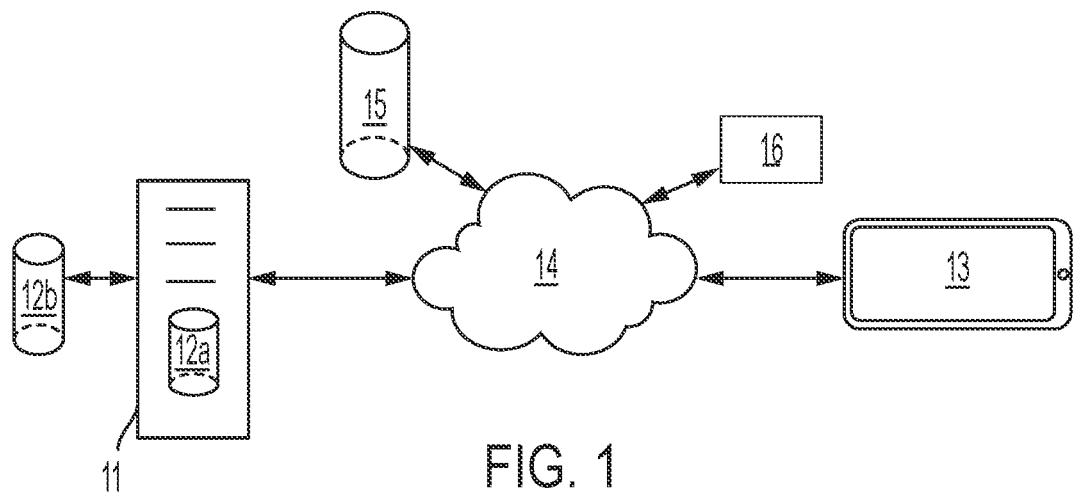
FIG. 1 shows the connectivity of the components of a system and method for automatically preparing personalized video presentations using dynamic scene replacement built in accordance with the present disclosure.
Figure 2:
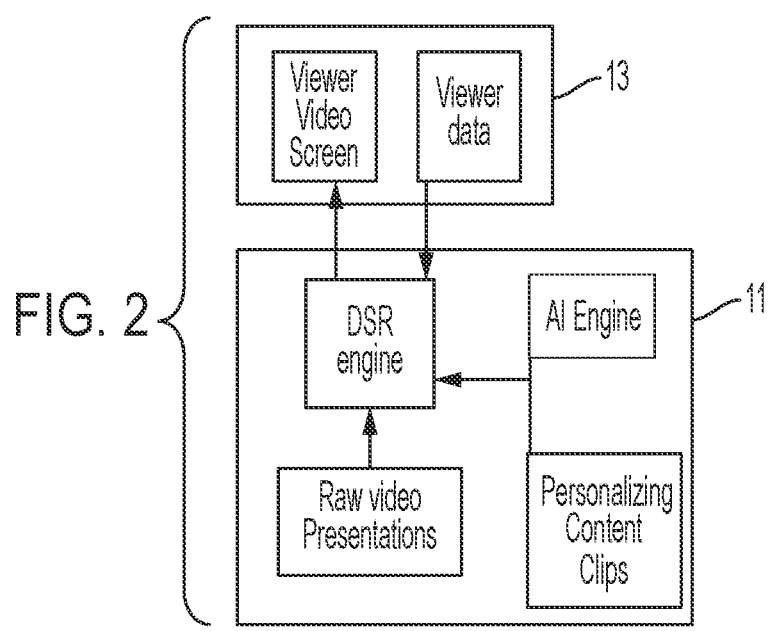
FIG. 2 is a block diagram of the data flow between the components of a system and method for automatically preparing personalized video presentations using dynamic scene replacement built in accordance with the present disclosure.
Figure 3:
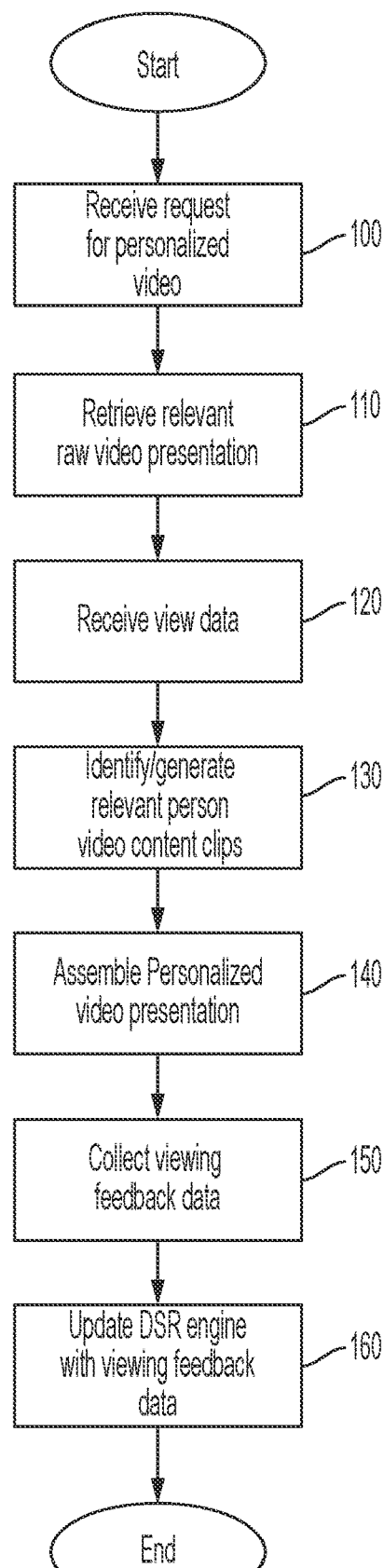
FIG. 3 shows the process though which a system and method for automatically preparing personalized video presentations using dynamic scene replacement prepares a personalized video presentation in accordance with the present disclosure.
Figure 4:
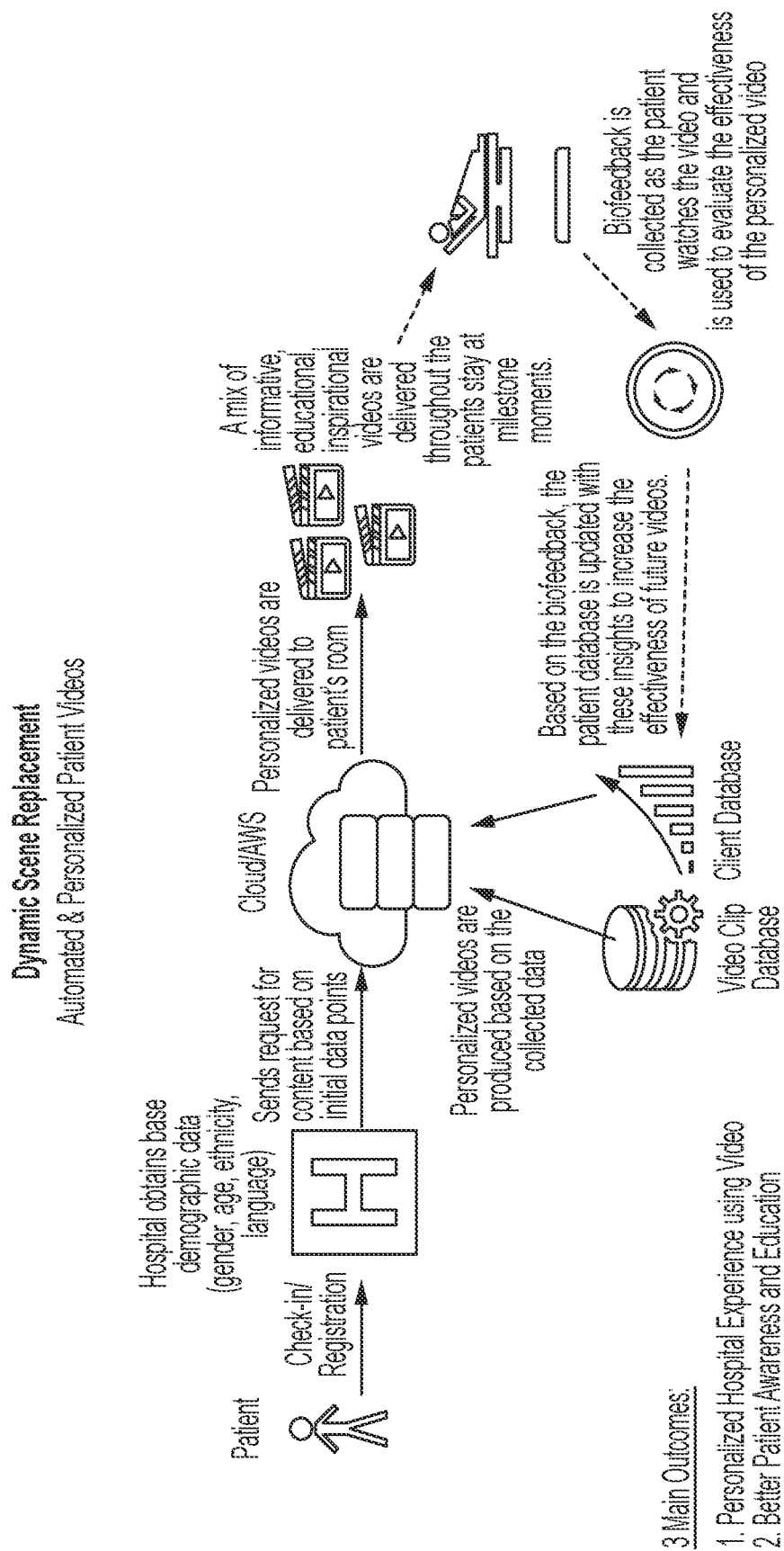
FIG. 4 shows the process though which a system and method for automatically preparing personalized video presentations using dynamic scene replacement in accordance with the present disclosure may be employed in a hospital environment.
Figure 5A:
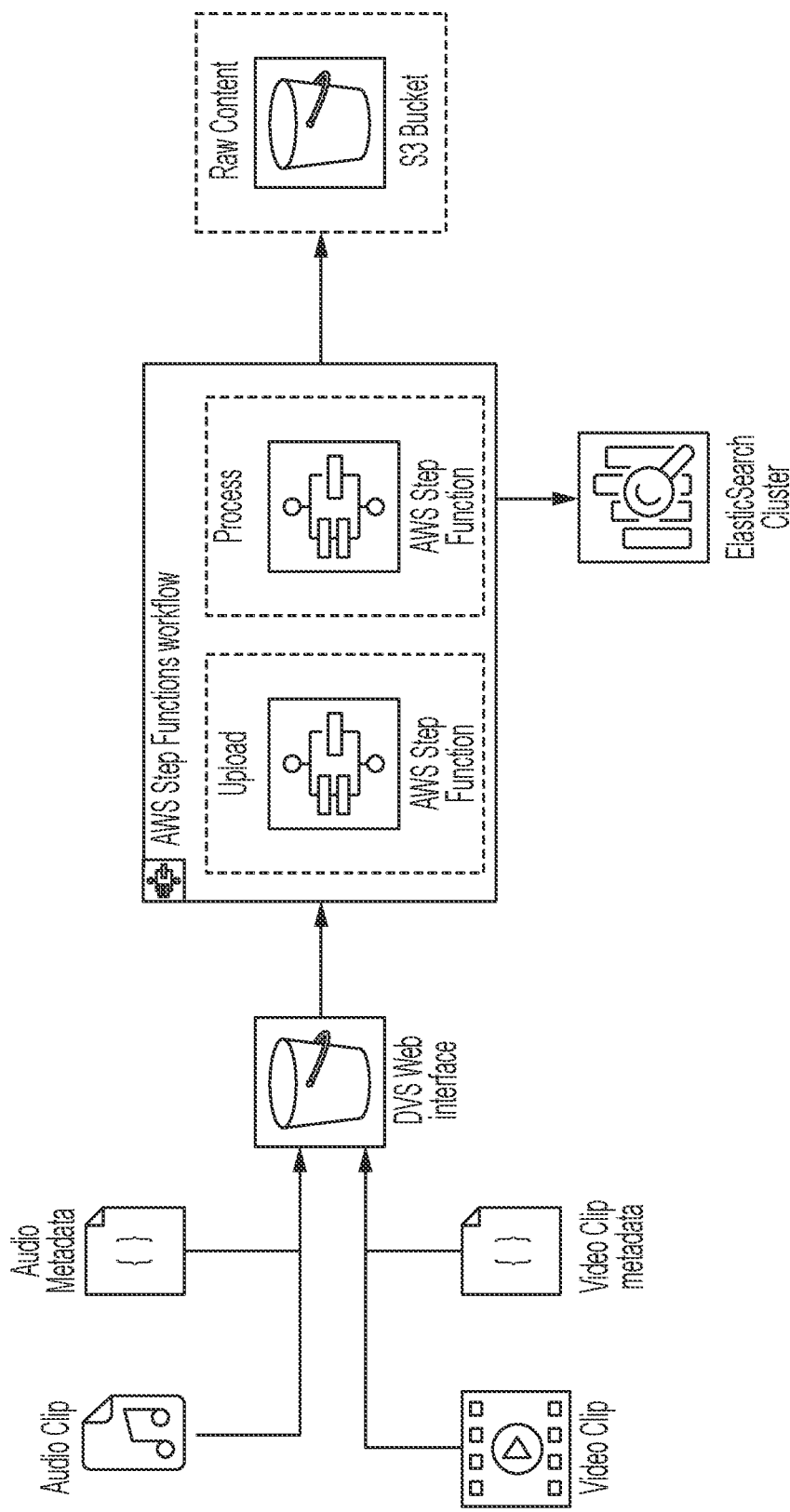
FIGS. 5a, 5b, and 5c shows the process flow of a system and method for automatically preparing personalized video presentations using dynamic scene replacement built in accordance with the present disclosure in a cloud computing services environment.
Figure 5B:
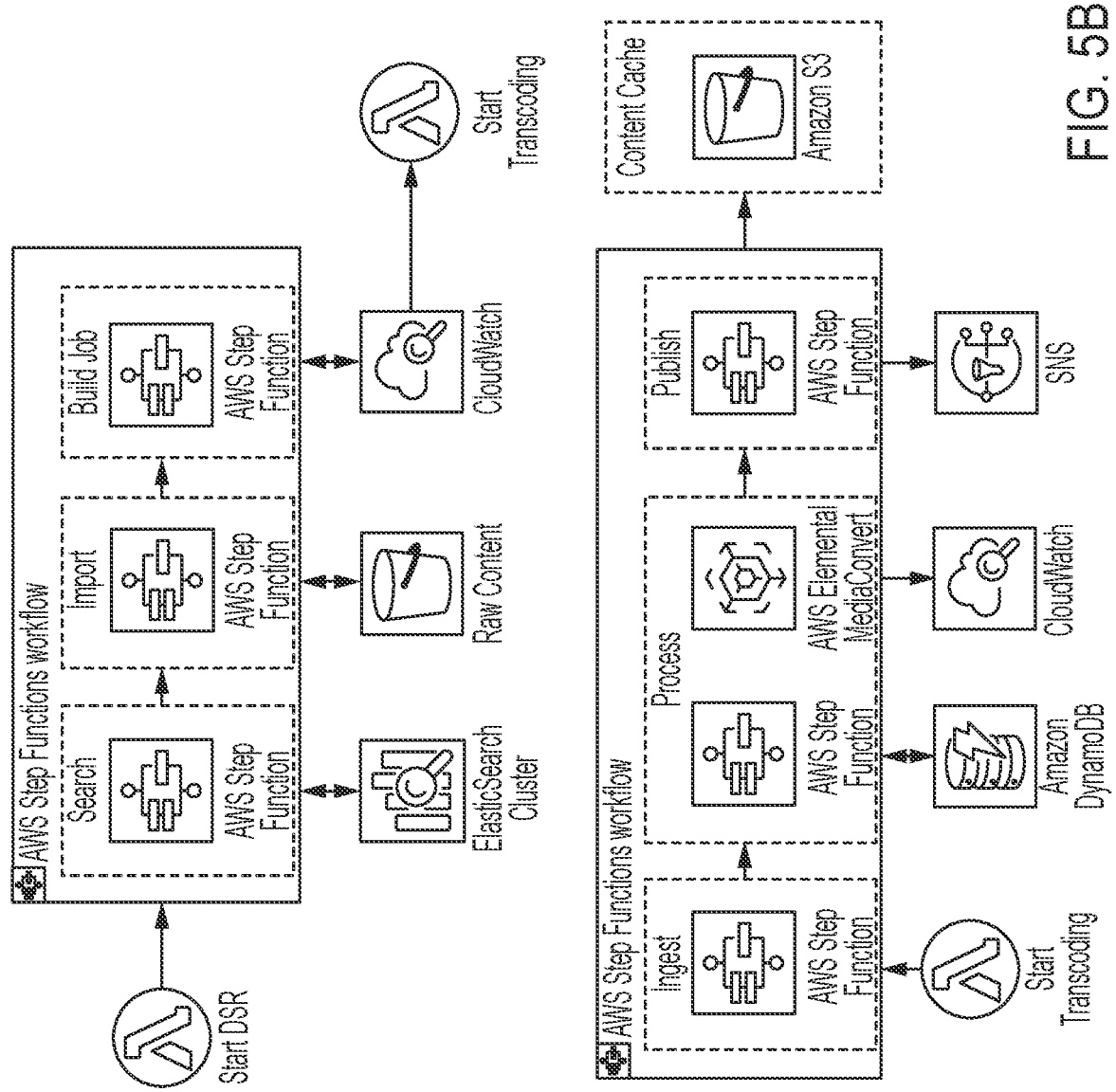
Figure 5C:
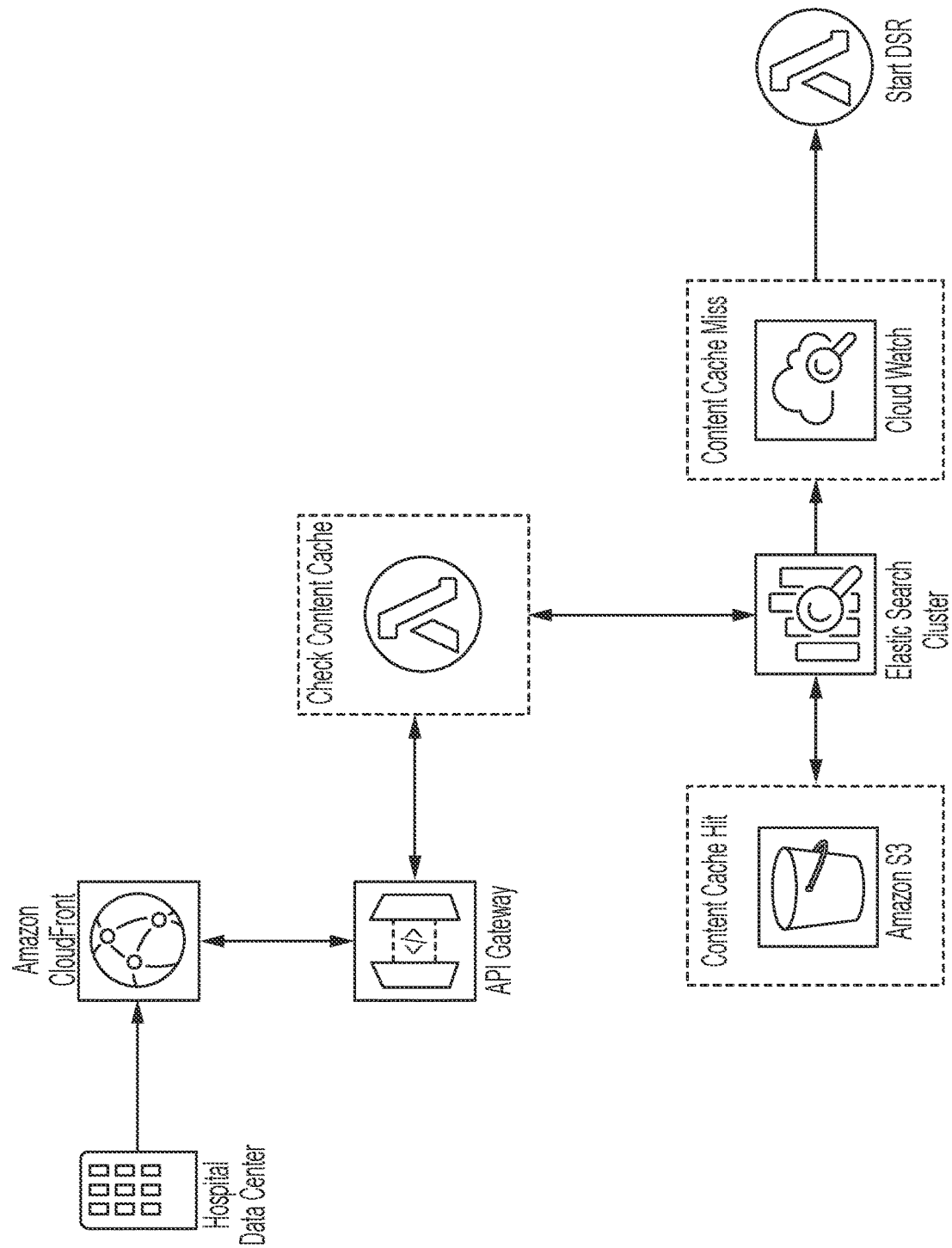

Referring now to the drawings and in particular FIGS. 1, 2, and 3, a system and method for automatically preparing personalized video presentations using dynamic scene replacement is shown as a computer network accessible computer system 11 that includes an internal master content database 12a and/or an external master content database 12b (collectively, a master content database 12). The computer system 11 may be defined as one or multiple computers having processor(s) and memory, with instructions embodied in software which cause the processor(s) to perform the operations of the method for automatically preparing personalized video presentations using dynamic scene replacement disclosed herein. The aspect of the computer system 11 which performs the operations of the method for automatically preparing personalized video presentations using dynamic scene replacement disclosed herein may be referred to herein as the dynamic scene replacement ("DSR") engine.

The computer system 11 is communicatively coupled with a user interface device 13, which may be a mobile computer that includes a user interface suitable to output video content, such as a smart phone, tablet or laptop, or any other electronic device that includes a user interface suitable to output video content, such as a smart television or a conventional television used with a media player or set top box. The computer system 11 may be communicatively coupled with the user interface device 13 through a computer network, such as the Internet 14, or other available electronic data transmission mechanism. As illustrated in FIG. 1, it is contemplated that the computer system 11 and master content database 12 may be communicatively connected to the user interface device 13 through Internet 14, and may be deployed through a cloud computing service.

At its core, the DSR engine drives the method for automatically preparing personalized video presentations using dynamic scene replacement. It acts generally to (1) collect user data, (2) use the collected data to pull matching clips from its database and/or generate matching clips using a generative artificial intelligence engine, (3) organize the matching clips in a coded video sequence, and then (4) cause the video to be rendered in the cloud (or locally) and (5) delivered to the viewer as a personalized version of the video.

More specifically, the method for automatically preparing personalized video presentations using dynamic scene replacement may begin with the DSR engine desiring or being requested to provide a video presentation to a viewer at step 100. To fulfill this, the DSR engine may retrieve a raw video presentation from master content database 12 that is relevant (either because of the message(s) it pertains to or otherwise) to the desired or requested video presentation at step 110. The DSR may alternatively generate such a raw video presentation using a generative artificial intelligence engine 16 which may be defined by an artificial intelligence/machine learning model for generating video clips in response to prompts and which is communicatively coupled with the computer system 11 through a computer network, such as the Internet 14, or other available electronic data transmission mechanism. Then, the DSR engine may receive viewer data at step 120. This viewer data may be categorized into a plurality of defined data points, and may be received either directly from a viewer's user interface device 13 or possibly from a discrete viewer data database 15 at which user data related to the viewer's user interface device 13 or an account(s) associated therewith is collected. For example, for a viewer with an account at a commercial video streaming service, the viewer data for that viewer may be stored at a site controlled by the commercial video streaming service provider (and the viewer may be required to authorize the DSR engine to access their data from the provider's database).

With the viewer data, the DSR engine may automatically identify personalizing video content clips in the master content database 12 which relate to the viewer data at step 130. In this regard, the personalizing video content clips may each include one or multiple meta tags which associate the personalizing video content clips with specific values in the data points in the viewer data. For example, for a viewer whose viewer data indicates is male and has topical interests in hockey and boating, the DSR engine may identify personalizing video content clips which have meta tags which label them as pertaining to male gender, hockey topical interest, and boating topical interest. In contrast, for a viewer whose viewer data indicates is female and has topical interests in photography and nature, the DSR engine may identify personalizing video content clips which have meta tags which label them as directed to female gender, photography topical interest, and nature topical interest.

Similarly, with the viewer data, the DSR engine may generate prompts for a generative artificial intelligence engine 16 to allow it to automatically generate personalizing video content clips which relate to the viewer data at step 130. In such an implementation, for the viewer whose viewer data indicates is male and has topical interests in hockey and boating, the DSR engine may prompt the generative artificial intelligence engine 16 to generate personalizing video content clips which would be desirable for a person of male gender with hockey and boating topical interests. And for a viewer whose viewer data indicates is female and has topical interests in photography and nature, the DSR engine may prompt the generative artificial intelligence engine 16 to generate personalizing video content clips which would be desirable for a person of female gender with photography and nature topical interests.

Next, the DSR engine automatically assembles a personalized video presentation that can be sent to the viewer's video screen on the viewer's user interface device 13 at step 140. The step of assembling is performed by combining the identified and/or generated personalizing video content clips with raw video presentations. The identified and/or generated personalizing video content clips may be combined with the raw video presentations by being inserted into designated replacement slots which may originally have generic base scenes in place at the raw video presentation stage. In this regard, it is contemplated that meta tags of the identified personalizing video content clips may additionally include a label which specifies one or multiple designated slots in which it may be placed, as discussed in greater detail below.

Advantageously, because the raw video presentations may originally include generic base scenes which are only removed when replaced by a personalizing video content clip, a personalized video presentation may be assembled and delivered whether or not every single designated replacement slot has been replaced with a personalizing video content clip. Moreover, it is contemplated that in a given video some of the generic base scenes may be replaced by identified personalizing content clips and others may be replaced by generated personalized video content clips.

Once a personalized video presentation is delivered, a closed loop data collection process may be employed to collect viewing feedback data. Such viewing feedback data could be any instantly collectable viewing related information, such as whether the video presentation was skipped, stopped, or was watched fully, even or if a link was clicked. Depending on where the video presentation was viewed and the available technology, it may also include biofeedback like change in mood state, attention drop off, and physiological reactions (such as changes in heart rate, pupil dilation, and so forth) to evaluate the effectiveness of that personalized video. This viewing feedback data may be collected (with the available timecode data to correlate the viewer feedback to the video data) and saved at step 150. It may further be applied to future video preparations with the assistance of artificial intelligence and machine learning at step 160 to increase the effectiveness of the DSR engine and its algorithms for viewers in the future. For example, the viewing feedback data may be employed to evaluate the effectiveness of stored personalizing video content clips and apply weights to the association between a stored personalizing video content clip and the related viewer data or between the effectiveness of generated personalizing video content clips to provide feedback to the generative artificial intelligence engine 16 or to adjust the prompt generation.

Such viewing feedback data may also allow the personalized video presentation to iterate live if the collection process is fast enough. For example, for a viewer that is viewing a personalized video presentation in the form of an advertisement that is showing a dog (whether in generic base scenes or in an inserted personalizing video content clip), if a facial sentiment analysis detects that the viewer is disinterested in the ad, DSR engine may replace the use of dogs in later scenes with cats or whatever other interests the viewer may have as revealed by their viewer data to ensure that the viewers attention is restored.

With respect to use of designated slots where personalizing video content clips may be placed, and the labeling of which specific designated slots in which a personalizing video content clip may be placed, a point of emphasis is that a clip action point must be labeled as well. For example, if the raw video presentation's voiceover says "Think about your life" and a personalizing video content clip of a young girl closing her eyes is inserted, it is important the action point of closing the eyes is marked in the clip and in the timeline of the overall video so that the action in the personalizing video content occurs at the correct time relative to the voiceover. If the scene starts with eyes already closed or cuts before she closes it, then the effect is diminished. If properly synchronized with the eyes closing on the proper musical beat and time relative to the voiceover, however, the emotional effect is much greater. Thus, the correct clip action points and the sequence action point must be labeled consistently and correctly for each of the designated slots for this to be achieved.

It is contemplated that when the generative artificial intelligence engine 16 is employed to generated personalizing content clips, if a multimodal system is used, the generic base scene which is being replaced in addition to the relevant prompts to allow for optimal action point synchronization.

Through the action described above, the DSR engine may fully personalize videos based on viewer data points and render it all in the cloud for delivery in real time, which allows for a countless number of variations of videos personalized to the viewer without manual editing. The raw video presentations may be manually coded to identify each specific designated slots and with the time code insertion points in the software. And for stored personalizing video content clips, they also may be coded with the correct metadata tags to associate not just with viewer data but the proper slot to replace the existing scene for the automation to be seamless. For generated personalizing video content clips, the clips may be generated for a specific slot in light of the viewer data based on the prompts being provided to the generative artificial intelligence engine.

Furthermore, it is contemplated that feedback from when the stored personalizing content clips can be used when generating personalizing content clips such that once enough manual sequences performed, the sequences could be automatically optimized when generated using artificial intelligence to generate personalized videos through machine learning. And still as a failsafe, in the event that the viewer metadata set is incomplete or non-existent, the generic raw video presentation version of the video can still be played.

It is appreciated that in some cases, a particular data point may not be binary, like male or female. In such a case, a data point weighting system may be used to measure the importance of data point value relative to another. For example, a person may have an interest in cats at a level of 5/10 and an interest in basketball at a level of 10/10. In this regard, the weights of different interest points may aid in the decision of proportioning the clips throughout the sequence. In general, there will be more clips of higher interest points to the viewer and less clips of lower interest points.

It is contemplated that the system and method for automatically preparing personalized video presentations using dynamic scene replacement may also be employed in a medical environment to effect positive patient health outcomes. Creating videos that induce positive sentiments through system and method disclosed herein could be a life-changing application and increase patient health outcomes. The unique part about this application is that closed loop portion of this form of this system and method would be collecting the patient biodata (galvanic skin response, EMG, pulse rate, EMR, etc.) to determine the emotional effectiveness and iterate the personalized video with machine learning. In the hospital setting unique patient data can be collected with regards to physiological reactions to the video. This viewer biodata can then be used to optimize the generation of future videos for positive mood induction and ultimately iterate it over and over again in different forms to achieve the most optimal delivery to positively affect the patient's mood state, ultimately aiding in their recovery.

It is contemplated that the use of feedback in such manner ultimately enables the DSR engine to operate for emotional induction. In this regard, the DSR engine may enable a custom audio/video presentation to be automatically generated using a render engine by detecting the current emotional state of the viewer and calculating the appropriate emotionally charged audio/video presentation in order to change the end emotional state of the viewer to a desired end emotional state. To do this, a desired final emotional state may first be selected in the engine while a current emotional state value is assigned based on what values being detected by a sensor or collection of sensors which are monitoring biodata or other data for the viewer. Taking this current emotional state value, the engine then may calculate the change state value between the current state emotion and that of the desired end emotional state. The engine then operates to generate and/or modify an audio/visual presentation based on this value to bring about the designed change. This generating and/or modifying is performed in the same way as described above with the operation of the DSR engine to automatically prepare personalized video presentations using dynamic scene replacement. Once the generate and/or modify an audio/visual presentation is ready, it is then sent to the viewer to induce the desired end state emotion. At this point, the new current emotional state of the viewer may be measured to see if the desired emotional end state is achieved or if the engine should try again using the feedback data to further modify how the next audio/visual presentation is generated and/or modified.

It is further contemplated that DeepFake and similar technologies may be utilized with the system and method for automatically preparing personalized video presentations using dynamic scene replacement to automate mass personalization of videos that have character dialogue in which the character(s) is replaced to essentially mirror the demographics of the viewer (Age, Ethnicity, Language, etc.) to create a more effective delivery of the message. In this regard, the most common personas could be pre-rendered and stored in a video database with meta tags or each persona could be generated on demand using a generative artificial intelligence engine (which may be particularly effective if an image or video of the using is available) and while using the same process of the method for automatically preparing personalized video presentations using dynamic scene replacement discussed above.

While the core idea may employ both pre-made clips in the master database that are meta-tagged and generated clips, each of which replace scenes in a base video, it is contemplated that a generative artificial intelligence engine may alternatively be able to create entire scenes that appear real, allowing the method for automatically preparing personalized video presentations using dynamic scene replacement to occur without have to use premade raw videos or clips. A computer could simply create the ideal video using computer-generated imagery. For example, the highly realistic rendering of a woman that looks like the viewer could be shown on the screen to maximize empathy from the viewer and eliminate the need for a database of millions of unique clips, with DSR engine providing for real time computer generated renderings of the ideal scenes and messaging for the viewer using the viewers metadata and the real time feedback being received to optimize what scenes are be generated later in the video while the video is playing.

Another implementation option may be the live personalization of video based on metadata collection of visual data of the viewer (Race, Age, Gender). For example, a person walks up to a kiosk with facial detection software on it. The software could detect the person's demographics and/or current mood state and play a video that is optimized to them, using this observed data as the data input from step 120. The camera may also detect cues in style like form fitting clothes and jewelry and play videos of products that are similar to the assumed taste of that consumer. The data collection of the viewer in this instance is real time and the video delivery is instant. The closed loop portion of this example is based on the viewers behavior (walk away, purchase, loss of attention, facial sentiment detection, and so forth). The same process could also be done without a camera using a wireless identifier unique to the user's phone or other electronic device for analysis. The phone unique identifier (Media Access Control address or International Mobile Equipment Identity number) of the viewers phone is used for meta data collection before (or while watching) the personalized video preparation. Then, the same closed loop algorithm training process may ensue on the backend and a profile of that viewer may be saved.

Another potential implementation is the use of the system and method for automatically preparing personalized video presentations using dynamic scene replacement in captive environments, such as aircraft and bus media centers. For example, a plane seat is a good example of where certain data about a viewer may be known and the viewer can be observed at the point of purchase to ensure that the personalized video preparation delivered to a certain seat was optimized to that person.

While most video and audio clips today are typically representations of the natural world (e.g., a car driving on a street, a person sitting at a cafe, a girl talking, and so forth), dynamic scene replacement may also use viewer metadata collections to assemble and/or generate basic light and/or audio frequency presentations that are most appropriate to the viewers desired outcome. So a more abstract presentation of light and/or audio would occur that would have an appearance more abstract in nature, specifically to illicit a physical effect or outcome. Effects such as, but not limited to, binaural audio, color sequencing, constructive interference and/or strobe lighting could be used in these applications to achieve the desired outcome. For example, if it was given that particular frequencies enhanced athletic performance, the dynamic scene replacement technology could be used in real time during performance, using biofeedback as an input and optimizing the output audio and/or video frequencies to aid in increasing the viewers physical performance. The same concept could be applied for the improvement of mindfulness or shift in mood state or overall health. If it was given that particular patterns of audio and/or visual frequencies aided in the improvement of mindfulness, mood state, or overall health, the use of dynamic scene replacement could be used as a method of optimizing that process by using real time viewer biofeedback to dynamically change the frequency output to the viewer.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for automatically preparing personalized video presentations, comprising the steps of:
    initiating a provision of a personalized video presentation for a first viewer;
    providing a raw video presentation, wherein said raw video presentation includes at least one designated replacement slot;
    receiving viewer data related to the first viewer, wherein the viewer data relates to a demographic characteristic of the first viewer and a topical interest of the first viewer;
    providing at least one personalizing video content clip which relates to the viewer data, wherein said at least one personalizing video content is not a part of the raw video presentation but is targeted for said at least one designated replacement slot;
    assembling the personalized video presentation, wherein the step of assembling includes inserting into said at least one designated replacement slot said at least one personalizing video content clip;
    collecting viewing feedback data, wherein viewing feedback data includes a sentiment determination relating to the first viewer; and
    applying at least one weight to the topical interest of the first viewer based on the sentiment determination.

2. The method of claim 1, wherein the viewer data relates to at least one of a current mood state of the first viewer.

3. The method of claim 1, wherein step of initiating is performed following the receipt of a request for a personalized video presentation.

4. The method of claim 1, wherein in said raw video presentation, said at least one designated replacement slot includes a generic base scene clip.

5. The method of claim 1, wherein the step of providing at least one personalizing video content clip which relates to the viewer data includes generating the at least one personalizing video content clip using an artificial intelligence engine.

6. The method of claim 1, wherein the step of providing at least one personalizing video content clip which relates to the viewer data includes identifying the at least one personalizing video content clip in a database.

7. The method of claim 1, wherein:
    said at least one personalizing video content clip includes a clip action point and said at least one designated replacement slot includes a sequence action point, each of which relate to a desired time for a desired action in said at least one personalizing video content to occur; and
    the step of assembling includes inserting into said at least one designated replacement slot said at least one personalizing video content clip with said clip action point synchronized with said sequence action point so that when the assembled personalized video presentation is played, the desired action in said at least one personalizing video content clip occurs at exactly the desired time.

8. The method of claim 1, wherein:
    said at least one personalizing video content clip includes a previously designated clip action point and said at least one designated replacement slot includes a previously designated sequence action point, each of which relate to a desired time for a desired action in said at least one personalizing video content to occur; and
    the step of assembling includes inserting into said at least one designated replacement slot said at least one personalizing video content clip with said clip action point synchronized with said sequence action point so that when the assembled personalized video presentation is played, the desired action in said at least one personalizing video content clip occurs at exactly the desired time.

9. The method of claim 1, wherein viewing feedback data includes at least biofeedback data relating to at least the change in the current mood state from the first viewer.

10. A method for automatically preparing personalized video presentations, comprising the steps of:
    providing a raw video presentation, wherein said raw video presentation includes at least one designated replacement slot;
    receiving viewer data related to the first viewer, wherein the viewer data relates to a demographic characteristic of the first viewer and a topical interest of the first viewer;
    providing at least one personalizing video content clip which relates to the viewer data, wherein said at least one personalizing video content is not a part of the raw video presentation but is targeted for said at least one designated replacement slot;
    assembling the personalized video presentation, wherein the step of assembling includes inserting into said at least one designated replacement slot said at least one personalizing video content clip;
    collecting viewing feedback data, wherein viewing feedback data includes a sentiment determination relating to the first viewer;
    applying at least one weight to the topical interest of the first viewer based on the sentiment determination.

11. The method of claim 10, wherein the step of providing at least one personalizing video content clip which relates to the viewer data includes generating the at least one personalizing video content clip using an artificial intelligence engine.

12. The method of claim 10, wherein the step of providing at least one personalizing video content clip which relates to the viewer data includes identifying the at least one personalizing video content clip in a database.

13. The method of claim 10, wherein the viewer data relates to at least one of a current mood state of the first viewer.

14. The method of claim 13, wherein viewing feedback data additionally relates to at least a change in the current mood state from the first viewer.

15. The method of claim 10, wherein in said raw video presentation, said at least one designated replacement slot includes a generic base scene clip.

16. The method of claim 10, additionally comprising the step of initiating a provision of a personalized video presentation for a first viewer, wherein step of initiating is performed following the receipt of a request for a personalized video presentation.

17. The method of claim 10, wherein:

said at least one personalizing video content clip includes a clip action point and said at least one designated replacement slot includes a sequence action point, each of which relate to a desired time for a desired action in said at least one personalizing video content to occur; and the step of assembling includes inserting into said at least one designated replacement slot said at least one personalizing video content clip with said clip action point synchronized with said sequence action point so that when the assembled personalized video presentation is played, the desired action in said at least one personalizing video content clip occurs at exactly the desired time.

18. The method of claim 10, wherein:

said at least one personalizing video content clip includes a previously designated clip action point and said at least one designated replacement slot includes a previously designated sequence action point, each of which relate to a desired time for a desired action in said at least one personalizing video content to occur; and the step of assembling includes inserting into said at least one designated replacement slot said at least one personalizing video content clip with said clip action point synchronized with said sequence action point so that when the assembled personalized video presentation is played, the desired action in said at least one personalizing video content clip occurs at exactly the desired time.

19. The method of claim 10, wherein viewing feedback data includes at least biofeedback data relating to at least the change in the current mood state from the first viewer.

20. The method of claim 2, wherein viewing feedback data additionally relates to at least a change in the current mood state from the first viewer.

* * * * *